ized Patent [19]  [11] 3,868,247
Ramacciotti  [45] Feb. 25, 1975

[54] STEEL PRODUCTION IN AN UPRIGHT ROTATING VESSEL

[75] Inventor: Aldo Ramacciotti, Rome, Italy

[73] Assignee: Centro Sperimentale Metallurgico S.p.A., Rome, Italy

[22] Filed: May 28, 1974

[21] Appl. No.: 474,088

Related U.S. Application Data

[63] Continuation of Ser. No. 199,024, Nov. 15, 1971, abandoned.

[30] Foreign Application Priority Data

Dec. 5, 1970 Italy .................................. 55212/70

[52] U.S. Cl. ......................................... 75/60, 75/43
[51] Int. Cl. .............................................. C21c 7/00
[58] Field of Search ............... 75/60, 43, 44 R, 44 S

[56] References Cited
UNITED STATES PATENTS

| | | | |
|---|---|---|---|
| 2,862,811 | 12/1958 | Eketorp et al. ...................... | 75/60 X |
| 3,169,055 | 2/1965 | Josefsson et al. .................... | 75/43 X |
| 3,511,644 | 5/1970 | Josefsson et al. .................... | 75/43 X |
| 3,672,869 | 6/1972 | Niehaus ................................. | 75/60 |
| R26,364 | 3/1968 | Kurzinski ............................... | 75/60 |

*Primary Examiner*—L. Dewayne Rutledge
*Assistant Examiner*—M. J. Andrews
*Attorney, Agent, or Firm*—Young & Thompson

[57] ABSTRACT

A process for the production of steel by melting and refining of a metallic charge, containing a variable percentage of carbon, in a vertical converter preferably rotating around its vertical axis, wherein said charge consists of solid materials such as steel scrap and iron in pigs, and possibly a relatively small amount of liquid pig iron, wherein the heat necessary for the melting and the overheating of said charge is supplied by the combustion of a liquid or gaseous hydrogen- and carbon-based fuel such as fuel oil, gas oil, natural gas, delivered by a suitable burner, by the combustion of the gases remaining from said first combustion and by the combustion of a small amount of coke, wherein during a great part of the melting stage and during the entire refining, a reducing atmosphere is set up and maintained in contact with the material of the charge, while out of contact with said material of the charge an oxidizing atmosphere is set up and maintained.

1 Claim, No Drawings

STEEL PRODUCTION IN AN UPRIGHT ROTATING VESSEL

This is a continuation, of application Ser. No. 199,024, filed Nov. 15, 1971, now abandoned.

Object of the present invention is a process for the production of steel.

In particular the invention concerns a process for the production of steel, where the metallic charge, entirely solid, is loaded into a converter and after having been melted under a reducing atmosphere, is refined in the same melting furnace.

Such processes for steel production where oxygen is blowed onto the surface of the bath have been well known in technology for a long time.

These processes consist of blowing oxygen onto the surface of a liquid metallic bath in the presence of a basic slag. The oxygen oxidizes the carbon and the elements present in the bath as impurities, for example silicium, phosphorus, manganese, which are thus extracted from the metallic bath and absorbed in part by the slag. The heat evolved from the combustion of these elements is in general sufficient to bring the steel up to tapping temperature and to melt a certain amount of solid charge. In order to carry out these processes it is necessary to have available liquid pig iron, which can come from a blast furnace, as well as from the facilities for its transfer, storage and mixing. These processes for making and processing liquid pig iron are very expensive and furthermore they require a costly maintainance. In addition, sometimes, it is necessary or desirable to operate independently both from the aforementioned facilities and from the impurities accompanying the pig iron, or to utilize such an amount of scrap that a thermal balance sufficient to melt the whole charge and to bring it to the tapping temperature cannot be insured.

Many methods suitable for making the steel production plant independently from the primary source of pig iron, or at least, capable of utilizing the highest possible percentage of non-melted charge, have been proposed.

One of these methods consists of adding compounds the oxidation of which is strongly exothermic, such as ferrosilicon, to the partially liquid charge; however these compounds are expensive and they increase the thermal content of the bath only within somewhat moderate limits.

Blowing of carbon particles together with oxygen has been also suggested, but even this method is not very effective from the viewpoint of an improvement of the thermal balance and besides the carbon particles which move with a high speed may damage the feeding pipes and even the blowing lance itself. Furthermore, during the process development, the gases produced by the refining reactions carry with them the aforementioned carbon particles which burn in a large amount within the stack, outside the converter and end by damaging, very rapidly, the stack itself and the other superstructures.

For the re-melting of the solid pig iron to be loaded into the converter, it has been proposed also to use a hot-blast cupola type furnace. This solution even though simpler than the blast furnace, is antieconomic because of the high costs of re-melting in the cupola furnace and rather complicate because the equipment and above all the transfer and storage means of the melted metal are cumbersome and the quantities processed are comparatively limited.

Furthermore, it has been proposed to utilize a burner introduced into the converter for the purpose of supplying the heat necessary for the melting of the solid charge.

The main drawback of this solution consists in that, during the melting, a considerable percentage of iron is oxidized with a large decrease in the metal yield of the process.

However, this method too, which incidentally has given excellent results, depends upon large availability of liquid pig iron.

In the continuation of the studies and experiments on this technique, a process which allows to work with an entirely solid charge has been found. This process is the main object of the present invention.

It is therefore the purpose of the present invention to supply a process allowing to work with an entirely solid charge, avoiding the main drawbacks until now connected with such a type of operation, that is large losses of iron through oxidation and excessive processing time, being these the drawbacks that, more than the others, make the processes of this kind already in use, economically uninteresting.

The specific object of the present invention is a process for the production of steel by melting a solid charge of steel scrap and/or by melting and refining a mixed solid charge of steel scrap and iron in pigs characterized by the fact that the melting is performed by setting and maintaining, within the converter, two reaction zones: a reducing zone in contact with the charge, and an oxidizing zone not in contact with the charge. That is made possible by burning, by means of a suitable device, and at a short distance from the charge, a liquid or gaseous carbon-and hydrogen-based fuel such as fuel oil gas oil or natural gas, with a substoichiometric amount of oxygen, in such a manner as to create an atmosphere rich in CO and $H_2$ and poor in $CO_2$ and $H_2O$, that is a reducing atmosphere, in the proximity of the metallic charge. The gases released by this substoichiometric combustion, in their way up to the converter mouth, meet a stream of oxygen with which they react and thus complete the oxidation process, liberating a supplementary amount of heat necessary for melting and overheating the steel. This second combustion of the oxidizing type takes place in a zone far removed from the metal charge.

The setting, according to the present invention of two reaction zones, a reducing zone in contact with the charge and an oxidizing one, permits to obtain rather high metallic yields and to perform the entire process in a shorter time than with the analogous processes available until today. The converter, in which the process is performed, can be of any type; however a converter rotating around a vertical axis, such as described and claimed in the Italian Pat. Nos. 649,499 and 772,775 should be preferably used. According to a preferred version of the present invention the charging is performed by first introducing into the converter coke in proportion of 20–50 kg/ton. Then the converter is filled with steel scrap and iron pigs (in case also liquid pig iron if available). At this point there are started a slow rotation (15–30 r.p.m.) of the converter and the lowering down of the burner, fed at this initial stage with 2–3 l./min. of fuel per ton of charge and with 4–6 Ncu.m/min. of oxygen per ton of charge, from now on called primary oxygen. The burner's flame melts part of the charge, allowing a further lowering of same burner, which in a time variable from 10 to 20 minutes reaches its final operative position, at a distance from the bottom of the converter ranging from 1 to 1.6 times the internal diameter of the converter itself.

At this moment the coke combustion starts and lime in proportion of 30–50 kg/ton is added. Once the burner has reached said operative position, the rotation speed of the converter is gradually increased up to the maximum value (50–85 r.p.m.) and at the same time the flow rate of the primary oxygen is decreased down to 2–3 Ncu.m/min x ton of charge. The reducing atmosphere thus established in contact with the melted or still pasty charge, prevents the iron oxidation.

While the flow rate of primary oxygen is decreased, the secondary oxygen stream is introduced through another lance (secondary lance), preferably with an annular shape, placed concentrically with respect to the burner and movable indipendently from the burner. Said lance is lowered within the converter in such a manner that its nozzles are placed at a distance from the converter mouth ranging from 10 to 60 percent of the value of the converter diameter. The secondary oxygen is supplied at an initial flow rate equivalent to about 2 Ncu.m/min x ton of charge and subsequently the said flow rate is increased up to about 3.25 Ncu.m/min x ton of charge.

At this stage, by properly regulating the flow rate of the primary oxygen from 1 to 2.5 Ncu.m/min x ton of charge, also the refining of the bath is performed, the carbon content being brought down to the desired value.

When the carbon has been eliminated from the bath, the oxygen blowing is stopped and the burner is turned off. At this moment the bath is completely melted and overheated in such a way that it is possible to carry out the pouring, or, in case, scorification or alloying etc. operations.

This second part of the process from the beginning of the blowing of the secondary oxygen to the turning off of the burner has a variable duration ranging from 20 to 35 minutes.

The process according to the present invention is of a most wide applicability: it makes the steelmaking shop autonomous, thus allowing to product steel with any type of metallic charge. Furthermore, the process is particularly economic as regards the costs of installation and of operation, and it is also very flexible because it is possible to regulate, during the blowing of the secondary oxygen, the carbon content of the bath as well as the content of impurities, - especially phosphorus - and of the alloying elements in the subsequent scorification, alloying etc. operations.

The process according to the present invention is furtherly described in the following example herein quoted only as an illustration and not as a limitation.

150 kg of coke and then 4,000 kg of steel scrap are loaded into the still stationary converter, filling it completely. A slow rotation of the converter is then initiated at 25 r.p.m. followed by the lowering of the burner, fed at this stage with 8 l./min of fuel oil and 16 Ncu.m/min of oxygen (stoichiometric combustion). After about 10 minutes the burner reaches its operative position at 130 cm from the converter's bottom. After the stoichiometric combustion of 100 l of fuel oil, the ignition of the coke occurs, as shown by the increase of the flame at the converter's mouth; at this point 150 kg of lime are added. At the same time the fast rotation of the converter (85 r.p.m.) is initiated and the flow rate of the oxygen (primary oxygen) to the burner is decreased to 8 Ncu.m/min in order to achieve a substoichiometric combustion. At this point the charge is partially melted, while the remainder is still in the pasty stage.

The secondary lance is then lowered and the oxygen flow delivered by the lance is adjusted at an interval varying from 8 to 13 Ncu./min according to the combustion intensity of the coke.

After 20 minutes the combustion of the coke is over. The converter, the primary and the secondary oxygen, as well as the fuel oil flow are stopped and the temperature of the bath is measured and found to be 1,580°C.

Then the rotation and the delivery of oxygen and fuel oil are resumed, adjusting the flow rate of the primary oxygen in such a manner as to decarburize the bath down to the desired carbon percentage. This second stage of blowing lasts 10 minutes; at the end the blowing is interrupted and the converter is stopped. At this point the bath temperature has increased to 1,650°C. The steel is poured and a 3,800 kg ingot is obtained with a 95 percent iron yield.

The present invention has been described with particular reference to a preferred embodiment thereof, but it is intended that variations may be introduced therein without infringing the protection limit of the present industrial patent.

Having thus described the present invention, what is claimed is:

1. A process for the production of steel by melting and refining of a metallic charge containing a variable percentage of carbon in a vertical converter having a vertical axis, comprising establishing a charge of solid ferrous metal and coke in said vertical converter, rotating the converter about said vertical axis, introducing and burning hydrocarbon fuel with primary oxygen in the vicinity of the charge to ignite the coke, then decreasing the flow rate of said primary oxygen to create a reducing atmosphere in a reducing zone immediately above and in contact with the charge and introducing secondary oxygen into the converter remote from the charge to maintain an oxidizing atmosphere in an oxidizing zone above said reducing zone and out of contact with said charge and to complete the combustion of gases from said reducing atmosphere in order to supply heat to the charge until the charge is melted and the combustion of the coke is over, and then adjusting the flow rate of said primary oxygen to reduce the carbon content of the melted charge to produce steel.

* * * * *